(12) United States Patent
Hanson (10) Patent No.: US 11,545,858 B2
(45) Date of Patent: Jan. 3, 2023

(54) WIRELESS DEVICE BATTERY CHARGING STATION LOCATION FINDER AND CHARGING SYSTEMS

(71) Applicant: Clinton Hanson, West Palm Beach, FL (US)

(72) Inventor: Clinton Hanson, West Palm Beach, FL (US)

( * ) Notice: Subject to any disclaimer, the term of this patent is extended or adjusted under 35 U.S.C. 154(b) by 385 days.

(21) Appl. No.: 16/900,872

(22) Filed: Jun. 13, 2020

(65) Prior Publication Data

US 2021/0083527 A1 Mar. 18, 2021

Related U.S. Application Data

(60) Provisional application No. 62/861,417, filed on Jun. 14, 2019.

(51) Int. Cl.
*H02J 50/80* (2016.01)
*H02J 50/12* (2016.01)
(Continued)

(52) U.S. Cl.
CPC .......... *H02J 50/80* (2016.02); *H02J 7/00034* (2020.01); *H02J 50/12* (2016.02); *H02J 50/20* (2016.02); *H02J 50/40* (2016.02); *H02J 2310/22* (2020.01)

(58) Field of Classification Search
CPC .. H02J 50/80; H02J 50/12; H02J 50/40; H02J 13/00028; H02J 7/00; H02J 7/0014; H02J 7/342; H02J 7/00034; H02J 7/0048; H02J 50/10; H02J 50/90; H02J 7/0013; H02J 13/00001; H02J 3/008; H02J 7/00045; H02J 7/0044; H02J 7/0047; H02J 7/02; H02J 13/00; H02J 13/00034; H02J 2203/20; H02J 2310/22; H02J 2310/48; H02J 3/322; H02J 50/20; H02J 7/00032; H02J 7/0071; H02J 7/00714; H02J 7/007192; H02J 7/345; B60W 2520/04; B60L 53/665; B60L 53/305; B60L 2240/72; B60L 53/62; B60L 53/32; B60L 2240/54; B60L 50/61; B60L 53/60; B60L 58/40; B60L 53/38;
(Continued)

(56) References Cited

U.S. PATENT DOCUMENTS

| | | | |
|---|---|---|---|
| 2012/0005125 A1* | 1/2012 | Jammer | G06Q 10/04 705/412 |
| 2016/0156207 A1* | 6/2016 | Frankenberger | H02J 7/0044 320/101 |
| 2019/0351783 A1* | 11/2019 | Goei | B60L 53/63 |

* cited by examiner

Primary Examiner — Binh C Tat (57) ABSTRACT

A battery charging system suitable for charging mobile devices is presented. The system includes a plurality of charging stations. The system also includes a charging station location identification system coupled with the plurality of charging stations. Further, the system includes a communications platform configured to provide a communication means for the plurality of charging stations. Additionally, the system includes a wayfinding system configured to provide prioritization information for potential users of the battery charging system and arranged to couple with the charging station location identification system and the plurality of charging stations. The system includes an alerting system configured to provide system status of a mobile device and arranged to interact with the wayfinding system. The system also includes a merchandising module configured to provide economic data and purchasing functions for the potential users of the battery charging system.

8 Claims, 7 Drawing Sheets

(51) Int. Cl.
*H02J 7/00* (2006.01)
*H02J 50/40* (2016.01)
*H02J 50/20* (2016.01)

(58) Field of Classification Search
CPC ........ B60L 53/302; B60L 53/30; B60L 53/68; B60L 58/12; G01C 21/343; G01C 21/3667
USPC .................................................. 320/106–115
See application file for complete search history.

WIRELESS DEVICE BATTERY CHARGING STATION LOCATION FINDER AND CHARGING SYSTEMS

CROSS-REFERENCE TO RELATED APPLICATIONS

This application claims priority to provisional application 62/861,417 filed on Jun. 14, 2019, and is incorporated herein by reference in its entirety.

FIELD OF THE INVENTION

This invention relates to an apparatus and method for locating a charging station, for a wireless device, using a transmission signal to locate the station and once located inductively or direct charging the device.

BACKGROUND OF THE INVENTION

Portable wireless devices, such as a cellular phone, a portable MP3 player, cassette tape players, a notebook computer, pagers, and PDAs are often battery operated and require chargers to recharge the batteries. In most cases the power chargers supply direct current (DC) to the device battery charging system, but the chargers themselves are powered from alternating currents (AC). The portable devices typically have a variety of DC charging voltages, where the chargers are often designed for a particular product, having their own physical and electrical interfaces and connectors. When a portable device, such as a phone, runs out of power, the user must have a charger available. The problem of compatibility between the chargers usually prevents a user to readily find someone with a charger that can be used to recharge.

Most charging is achieved using a cable wired between a charger and a device. There is the further inconvenience resulting from the different configurations, pin assignments and physical shapes of charging terminals requiring users to have to repeatedly purchase a new charging device. Previous unsuccessful attempts to address these problems were costly and logistically cumbersome. What is needed is a charger that can be used on any phone equipped with a universal way of effectuating the recharge. Typically, a non-contact type magnetic induction method, i.e., a non-wireless charger, which works by transferring energy from a charger to a portable device, such as a phone via electromagnetic induction is the solution.

The non-contact type charging method of providing current of a charging parent, i.e., energy, to the battery of a portable electronic device through inductive coupling can be achieved via different methods. One technique configures a primary circuit operating at a high frequency, in the charging station and configuring a secondary circuit at the device's battery side, i.e., in a portable electronic device or the battery. The non-contact type charging method using the inductive coupling is already used in some application fields (e.g., an electric toothbrush, an electric shaver.

However, when the non-contact type charging method is desired to be applied to a portable electronic device, such as a cellular phone, a portable MP3 player, cassette tape player, a notebook computer, a PDA or the like, the user generally purchases, the charger system. These systems themselves are not conveniently made portable. Not having the charger system when a battery runs down prevents the user from operating the device. If a user requires this type on non-contact system to charge their device, an alternative location of such devices must be ascertainable. No product now exists that allows a user, who desires to utilize a non-contact type charger, to easily locate such charger. What is needed is a means to locate charging stations, where a user can charge a portable device. Once the charging station is located the user can choose to charge the device using a non-contact inductive charging method or the more conventional method of attaching a wire between the charging station and the portable device.

Accordingly, there is an established need for wireless device charging platforms which solve at least one of the aforementioned problems. Further, there is an established need for a wireless device location finder and charging system, having various forms, that can provide location information of charging stations and allow charging of mobile devices.

SUMMARY OF THE INVENTION

The disclosure herein relates to a wireless charging apparatus and portable device having a transmit/receive function, configured to identify the location of the charging apparatus. The charging apparatus and the device each have Bluetooth or equivalent transmitting and receiving capability, to allow a user to thereby locate and then obtain access to an electronic charging station to restore the charge on the device. The wireless charging apparatus contains a charging system using non-contact type magnetic induction to charge the wireless charging receiver.

According to an aspect of the present invention, a battery charging system suitable for charging mobile devices is presented. The system includes a plurality of charging stations. The system also includes a charging station location identification system coupled with the plurality of charging stations. Further, the system includes a communications platform configured to provide a communication means for the plurality of charging stations. Additionally, the system includes a wayfinding system configured to provide prioritization information for potential users of the battery charging system and arranged to couple with the charging station location identification system and the plurality of charging stations. The system includes an alerting system configured to provide system status of a mobile device and arranged to interact with the wayfinding system. The system also includes a merchandising module configured to provide economic data and purchasing functions for the potential users of the battery charging system.

According to another aspect of the present invention, a method of charging a battery, the method suitable for use in charging mobile devices is provided. The method includes locating a plurality of charging stations with a charging location identification system. The method also includes communicating from a communications platform information associated with the plurality of charging stations. Further, the method includes developing and presenting battery charging options utilizing a wayfinding system configured to provide prioritization information for potential users of the battery charging system. Additionally, the method includes annunciating with an alerting system configured to provide system status of a mobile device and arranged to interact with the wayfinding system. The method includes commercializing battery charging systems utilizing a merchandising module configured to provide economic data and purchasing functions for the potential users of the battery charging system. The method also includes charging a battery utilizing the plurality of charging stations.

In an embodiment, the system can include mobile applications (Apps). The Apps can be configured to reside on mobile devices and can provide charging station location information. The Apps can also provide mobile device system status checks such as but not limited to battery condition, battery charge, remaining time left on battery, location of available charging stations, the cost of charging stations, how to travel to the nearest or less expensive charging station.

In another embodiment, the Apps can also include alarming or alerting features to include a plurality of annunciation protocols. The annunciation can include audible beeps or chirps. The annunciation can include flashing or blinking lights. The annunciation can be configured to increase in audible or visual output depending upon how far or near a user is to a charging station. The alerts can also be physical such as vibrating and/or pulsing.

In yet another embodiment, the system can include range and wayfinding features. The wayfinding features can include indicating travel paths to reach a charging station. The system can also include path finding for users based on cost factors involved in charging a battery. The system can include providing a user options for charging a battery based on nearby charging stations based on distance to station, cost of charging at the station, the type of charging available such as magnetic inductive charging, magnetic resonance charging or radio frequency charging.

In an aspect, the system can include a fuse. The fuse can be configured to open upon expiration of time that the charger has been in service. The fuse function can be configured to expire after 2, 4, 6, 10, 12, 14, or 24 months in service and/or any time frame in between. The fuse function can cause the charging station to open and go off line, resulting in the need for commercial replacement of the charging station. The fuse can also be programmed to open when a predetermined number of charging cycles has occurred.

In another aspect, the system can also include charging station location identification features allowing system users to identify location of available charging stations. The system can include Global Positioning System (GPS) allowing location information to be shared between users of the system and components of the system.

In yet another aspect, the system can include communications means including wireless fidelity (Wi-Fi), broadband over power lines (BPL), digital subscriber line (DSL), Bluetooth, radio frequency, personal area network (PAN), and/or cell tower communications capabilities.

In an embodiment, the system can include wireless and wired mobile device battery charging capabilities based on physical location and/or availability and/or cost.

In another embodiment, the system can also include expiration dates for system components. The system can include automatically taking components out of service based on expiration of time or after a predetermined set of charging cycles. The system can also include manual and automatic charging features of a mobile device battery and a charging station. The system can include charging cycle limits based on a percentage of manufacturer expected cycle life.

In yet another embodiment, the system can also include manual charging features including buttons on mobile device cases allowing a user to manually charge or terminate a charge.

In an aspect, the system can include placement of a fuse in line with a power supply cord to the charging station.

In another aspect, the system can also include commercialization features designed to monetize mobile device battery charging station systems to include offering different costs for types of charges desired, different costs for the speed of a charge such as trickle charging, rapid charging, or high amperage charging.

In yet another aspect, the system can include payment methods wherein system users can pay for charging services with automatic or manual payment features. The system can include non-touch payment systems, scan payment systems, biometric authorization payment systems, debit card and credit card utilization mechanisms.

In an embodiment the system includes a mobile application operating on a mobile device.

In another embodiment the system can also include a plurality of charging stations which includes magnetic inductive charging, magnetic resonance charging, direct current hard wire, or radio frequency charging battery charging capabilities.

In yet another embodiment, the system can include a charging station location identification system which includes utilizing GPS, Bluetooth, Wi-Fi, mobile device location device, and cell phone call and text features to provide charging station location information to users of the system.

In an aspect, the system can include a wayfinding system which includes providing charging station location directions to users based on expected travel time to the charging stations, cost of charging station calculations, location within a building, fastest route to the plurality of charging stations, and preferred charging station location based on type of battery charge desired.

In another aspect, the system can also include an alerting system which includes providing alarms and alerts configured to be received by a user of the system and wherein the alarms and alerts include physical, audible and/or visual annunciations.

In yet another aspect, the system can include a merchandising module which provides for ascertaining costs of the plurality of charging stations, automatically choosing a predetermined payment method, and completing a sale of charging services.

In an embodiment, the system can include a life cycle of the plurality of charging stations which is based on a predetermined time in service or a predetermined number of charging cycles.

In another embodiment, the system can also include a communications platform which is configured to provide near real-time communication between the system and a mobile device. In yet another embodiment, the system can include a wayfinding system which includes annunciation capabilities on the plurality of charging stations.

These and other features and advantages will become apparent from the following detailed description of illustrative embodiments thereof, which is to be read in connection with the accompanying drawings.

BRIEF DESCRIPTION OF THE DRAWINGS

The above and other aspects and features of certain embodiments of the present disclosure will be more apparent from the following detailed description taken in conjunction with the accompanying drawings, in which.

DETAILED DESCRIPTION OF THE INVENTION

The following description includes the best mode of carrying out the invention and is for the purpose of illustrating the general principles of the invention and should not be taken in a limiting sense. The scope of the invention is determined by reference to any claims. Each part or function is assigned, even if structurally identical to another part, a unique reference number wherever that part is shown in the drawing figures.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise As used herein, the singular forms "a", "an", and "the" are intended to include the plural forms, including "at least one", unless the content clearly indicates otherwise. "Or" means "and/or". As used herein, the term "and/or" includes any and all combinations of one or more of the associated listed items. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

In this disclosure, an electronic device may be a device that involves a communication function. By way of example, and not limitation, an electronic device may be a mobile device, a smart phone, a tablet PC (Personal Computer), a mobile phone, a pager or beeper, a video phone, an e-book reader, a desktop PC, a laptop PC, a netbook computer, a PDA (Personal Digital Assistant), a PMP (Portable Multimedia Player), an MP3 player, a portable medical device, a portable speaker, a music player, a single or multiport USB device, a digital camera, or a wearable device (e.g., an HMD (Head-Mounted Device) such as electronic glasses, electronic clothes, smart devices, smart clothes, wearable devices, an electronic bracelet, an electronic necklace, an such as a smart watch).

Figure 1:
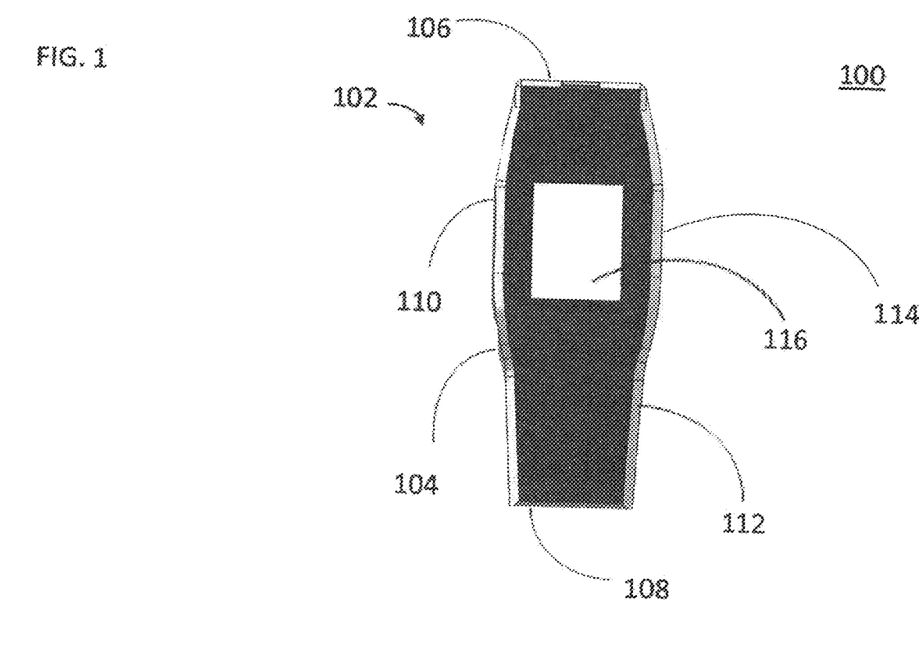
FIG. 1 is a block diagram of various portable devices in relation to a charging stations, according to various embodiments of the present disclosure.
Figure 2:
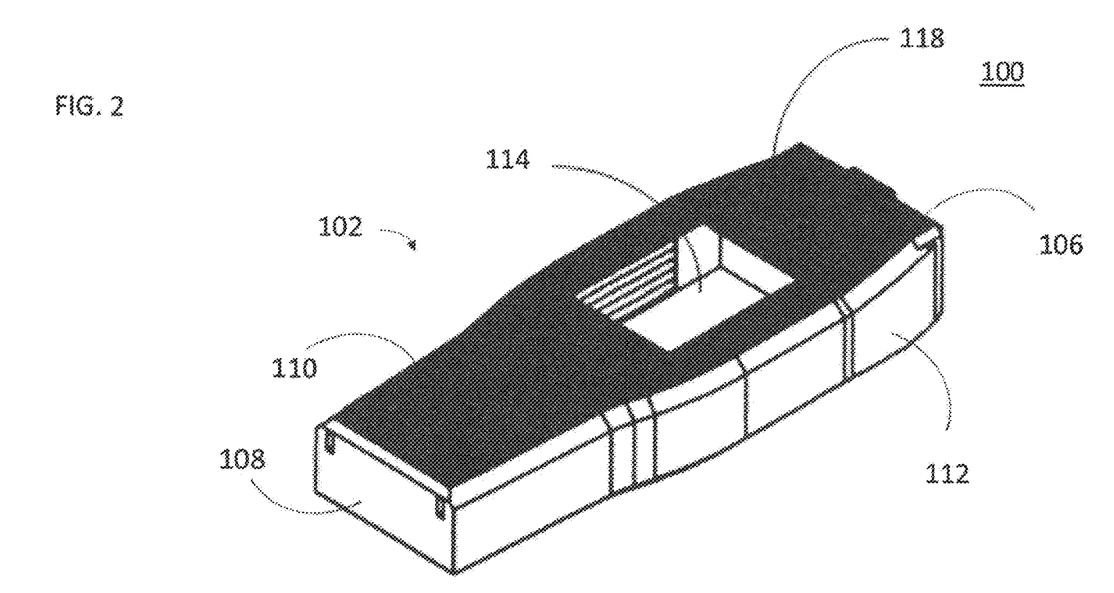
FIG. 2 is diagram of a building showing hypothetical locations of charging stations and a user in need of a charge for a portable device according to various embodiments of the present disclosure.

As well understood by those skilled in the art, the above-mentioned electronic devices are examples only and not to be considered as a limitation of this disclosure. FIG. 1 is a block diagram illustrating a network environment 100, including therein an electronic device 102*a* through 102*n*, in accordance with an embodiment of the present disclosure. Referring to FIG. 2, a user 101, present in a building, such as an office building, school, public building, airport terminal or restaurant, by way of example, desires to locate a portable device charging station, 104*a*, 104*b*, 104*c*, in its proximity.

Figure 3:
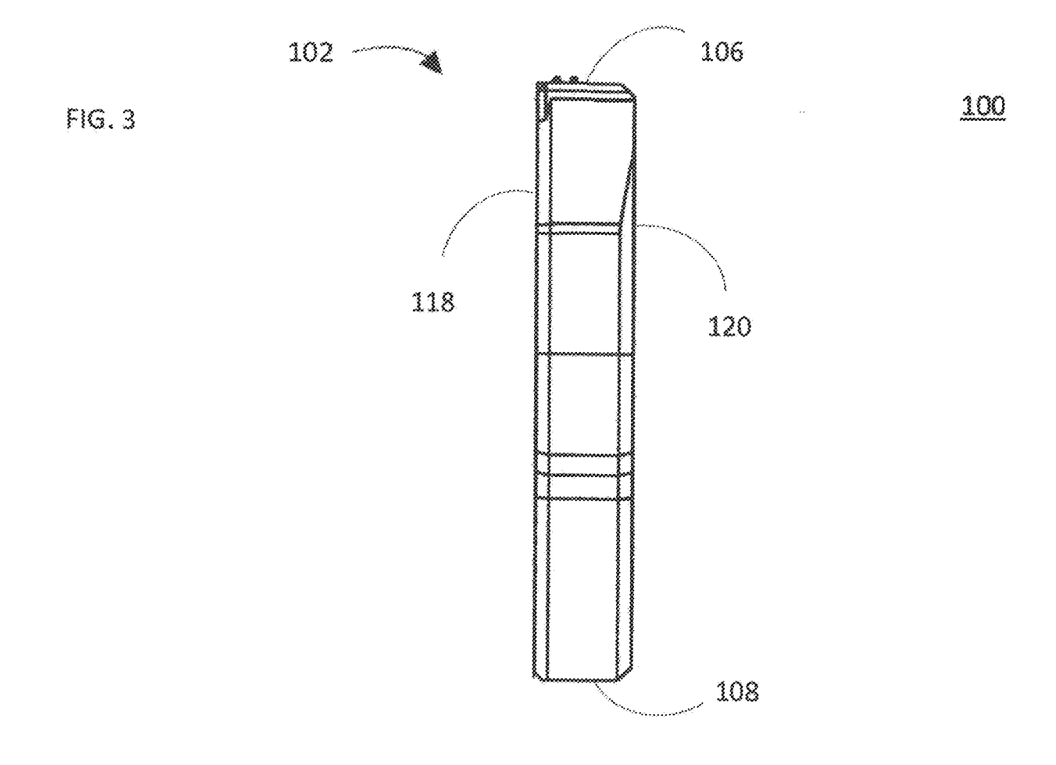
FIG. 3 is a block diagram of an electronic device according to various embodiments of the present disclosure.

Referring to FIG. 1 and FIG. 3, the electronic device 102, i.e., 102(*a-n*), may include portable devices which incorporate, a bus 110, a processor 120, a memory 130, an input/output interface 150, a display 160, a communication interface 170, a rechargeable battery, 180, a Bluetooth signal sensor and an optionally an induction charging peripheral 190, an application control module 140, having functionality for an application 147, application programming interface, 145, middleware, 143 and a kernel 141.

The bus 110 may be a circuit designed for connecting the above-discussed elements and communicating data (e.g., a control message) between such elements. The processor 120 may receive commands from the other elements (e.g., the memory 130, the input/output interface 150, the display 160, the communication interface 170, or the application control module 140, etc.) through the bus 110, interpret the received commands, and perform the arithmetic or data processing based on the interpreted commands.

The memory 130 may store therein commands or data received from or created at the processor 120 or other elements (e.g., the input/output interface 150, the display 160, the communication interface 170, or the application control module 140, etc.). The memory 130 may include programming modules such as a kernel 141, a middleware 143, an application programming interface (API) 145, and an application 147. Each of the programming modules may be implemented in software, firmware, hardware, and any combination thereof.

The kernel 141 may control or manage system resources (e.g., the bus 110, the processor 120, or the memory 130, etc.) used for performing operations or functions of the other programming modules, e.g., the middleware 143, the API 145, or the application 147. Additionally, the kernel 141 may offer an interface that allows the middleware 143, the API 145 or the application 147 to access, control or manage individual elements of the electronic device 102.

The middleware 143 may perform intermediation, by which the API 145 or the application 147 communicates with the kernel 141 to transmit or receive data. Additionally, in connection with task requests received from the applications 147, the middleware 143 may perform a control (e.g., scheduling or load balancing) for the task request by using technique such as assigning the priority for using a system resource of the electronic device 102 (e.g., the bus 110, the processor 120, or the memory 130, etc.) to at least one of the applications 147.

The API 145, which is an interface for allowing the application 147 to control a function provided by the kernel 141 or the middleware 143, may include, for example, at least one interface or function (e.g., a command) for a file control, a window control, an image processing, a text control, and the like. According to non-limiting embodiments, the application 147 may include an SMS/MMS application, an email application, as well as an indicator when the device 102 is fully charged.

Additionally, or alternatively, the application 147 may be an application associated with an exchange of information between the electronic device 102 and any external electronic device. In a preferred embodiment, external electronic charging station 104, sends out a coded Bluetooth signal 107, which device 102 is programmed to receive. Device 102 may also receive other coded Bluetooth signals from other charging stations 104 in the vicinity. Bluetooth signal sensor 180 determines, on relative scale, the strength of a coded signal 107 from charging station 104. Bluetooth signal sensor 180 also may also receive transmissions from other coded Bluetooth signals from transmitters in its vicinity. However, the application 147, (1) reads coded outputs from each of the transmissions 107 received by the Bluetooth signal sensor 180, (2) evaluates the signal strength between the two or more coded Bluetooth signals received, and (3) selects the code from the stronger of the two or more coded Bluetooth signals received, and (4) thereafter only respond to coded Bluetooth signals from the charging station 104 that was determined the stronger among competing signals.

Application 147 may also include a notification from device 102 to the charging station 104, that device 102 is within its proximity. In an alternate embodiment, the charging station 104 may transmit a pulsed signal that increases in frequency the closer that the device 102 is to charging station 104, which is a method of estimating proximity based on a signal strength of its Bluetooth transmission/reception. As the user 101 moves toward the charging station, the received coded Bluetooth signal gets stronger, both in signal strength 107, and in the alternate embodiment in the frequency of pulses received by the charging station 104.

If the user 101 were to walk away from the charging station 104, the coded Bluetooth signal would get weaker. The strength of the signal 107 is converted to one of a volume of sound, or a flashing light that increases flash frequency proportional to the signal strength, or shows, in the display 160, that the user 101 is moving toward or away from the charging station 104. For example, the input/output interface 150 may output voice data, processed through the processor 120, to a user 101 through the speaker to allow for access to the visually impaired.

The display 160 may contain LCD (liquid crystal display), LED (Light Emitting Diodes) 161, OLED (Organic Light Emitting Diode), MEMS (Microelectromechanical systems) Display, and electronic paper display. The display 160 may display thereon various kinds of information (e.g., multimedia data, text data, etc.) to a user 101. The display 160 may contain touch screen and, for example, the display 160 may receive touch using electronic pen or a portion of the user's 101 body, gesture, and hovering input.

The communication interface 170 may communicate 107 between the electronic device 102 and any external electronic device (e.g., the charging station 104). For example, the communication interface 170 may communicate with any external device by being connected with a network 162 through a wired or wireless communication. A wireless communication 164 to an electronic device 102 for example may include, but not limited to, at least one of Wi-Fi (Wireless Fidelity), BT (Bluetooth), NFC (Near Field Communication), GPS (Global Positioning System), or a cellular communication (e.g., LTE, LTE-A, CDMA, WCDMA, UMTS, WiBro, or GSM, etc.).

An example of transmission over network 162 is where an electronic device 102 may be used in its conventional application as a telecommunication device, as by way of example and not limitation, a cell phone or a pager. Other examples of an electronic device 102 includes but is not limited to audio-visual player devices, e-book readers, single or multi-port USB hubs, portable speakers, game systems, and music players. Pertinent to the disclosure herein, a communication may involve determining GPS location. In one non limiting embodiment, the display 160 may output location information determined by at least one of the processors 120, the application 147, and a GPS module, where the user 101 is too far from a charging station 104, to receive its coded Bluetooth signal. In this embodiment, application 147 has in memory one or more GPS locations in the proximity of a charging station 104. In this case the user 101, using an APP, requests a GPS location that is matched, either in a cloud database or database contained in device 102, to a charging station 104 is closest to the user 101. The user 101 is guided to the proximity of a charging station 104, until the charging station 104, coded Bluetooth signal is detected, at which time the system 100 operates in accordance a described above.

According to an embodiment, more generally the network 162 may be a communication network, which may include at least one of a computer network, an Internet, an Internet of things, or a telephone network. According to an embodiment, a protocol (e.g., transport layer protocol, data link layer protocol, or physical layer protocol) for a communication between the electronic device 102 and any external device may be supported by at least one of the application 147, the API 145, the middleware 143, the kernel 141, or the communication interface 170.

Figure 4:
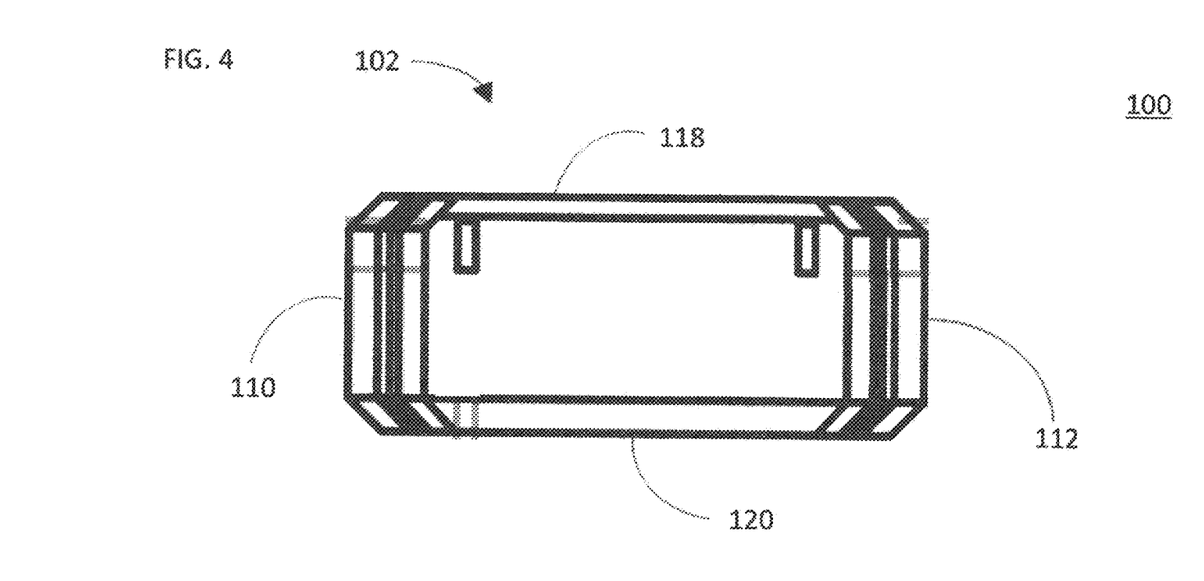
FIG. 4 is a schematic of an induction coil according to various embodiments of the present disclosure.
Figure 5:
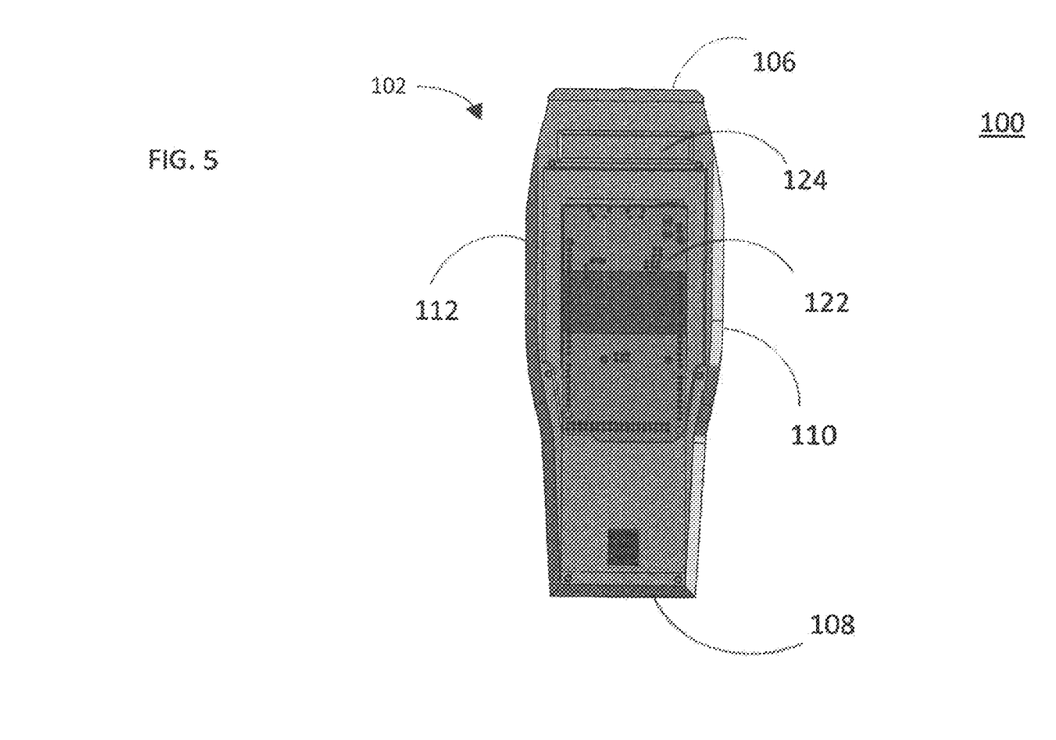
FIG. 5 is a diagram of an electronic charging apparatus according to various embodiments of the present disclosure.

To accomplish the above objective of charging the device 102, according to one non limiting embodiment of the present invention, using a non-contact type magnetic induction, requires that the charging station utilize an electronic circuit that provides a coil 52 (See, FIG. 1, FIG. 4) capable of radiating electromagnetic energy as part of the charging station 104 function. As shown in FIG. 1 and FIG. 5, wireless charging works by transferring energy from the charging station 104 to the device 102 via electromagnetic induction. A battery 192, is embedded in the portable device 102. A surface 113 containing a transforming element is held against the electromagnetic radiating of the surface of charging station 104. The charging station 104 creates an electromagnetic radiating surface through the induction coil 52 to create an alternating electromagnetic field, which an induction charging peripheral 190, in the device 102, converts back into electricity to charge the battery 192. The induction charging peripheral 190 may be also utilized in devices 102 that require additional amplification of the charging station 104 radiating electromagnetic field. The application 147 controls reception of wireless power, and determines when the battery 192 is fully charged, at which time the display indicates that full charge has been reached.

In one embodiment charging station includes lights, such as by way of example, in form of LEDs 110, indicate the strength of the energy that is at any given time used to charge a particular phone. In addition to the induction charging afforded by charging station 104, there are alternative means to charge devices, such as device 108, via the conventional USB or other cable configuration.

Figure 6:
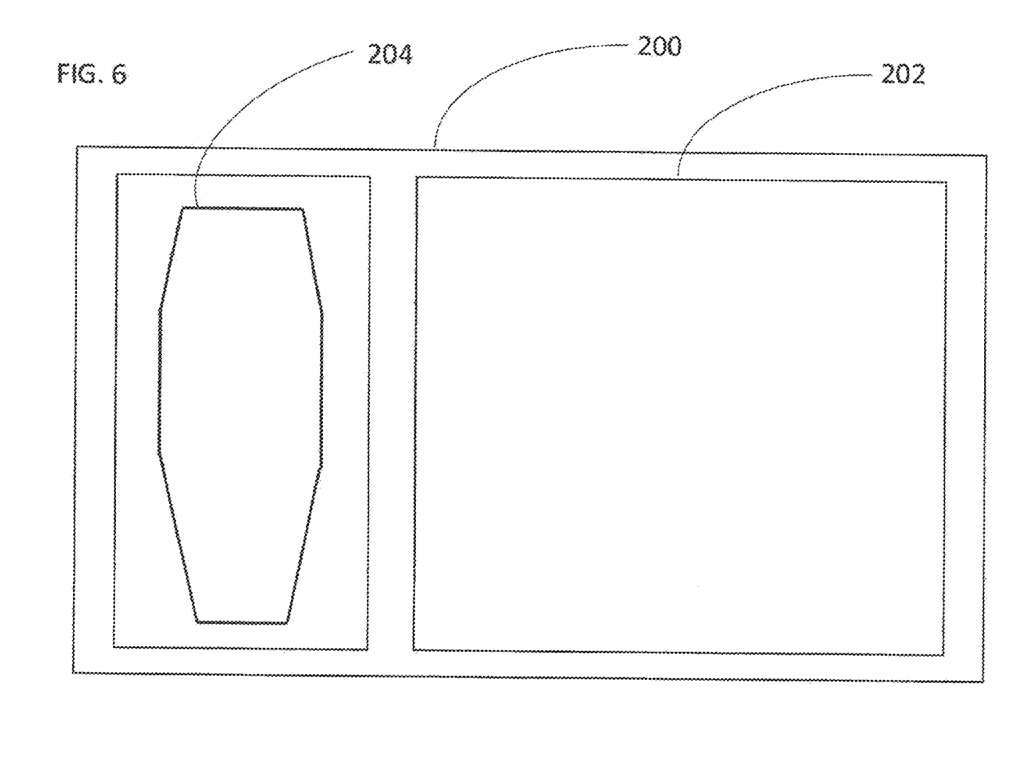
FIG. 6 is a flow chart of a method in an embodiment of the present invention.
Figure 7:
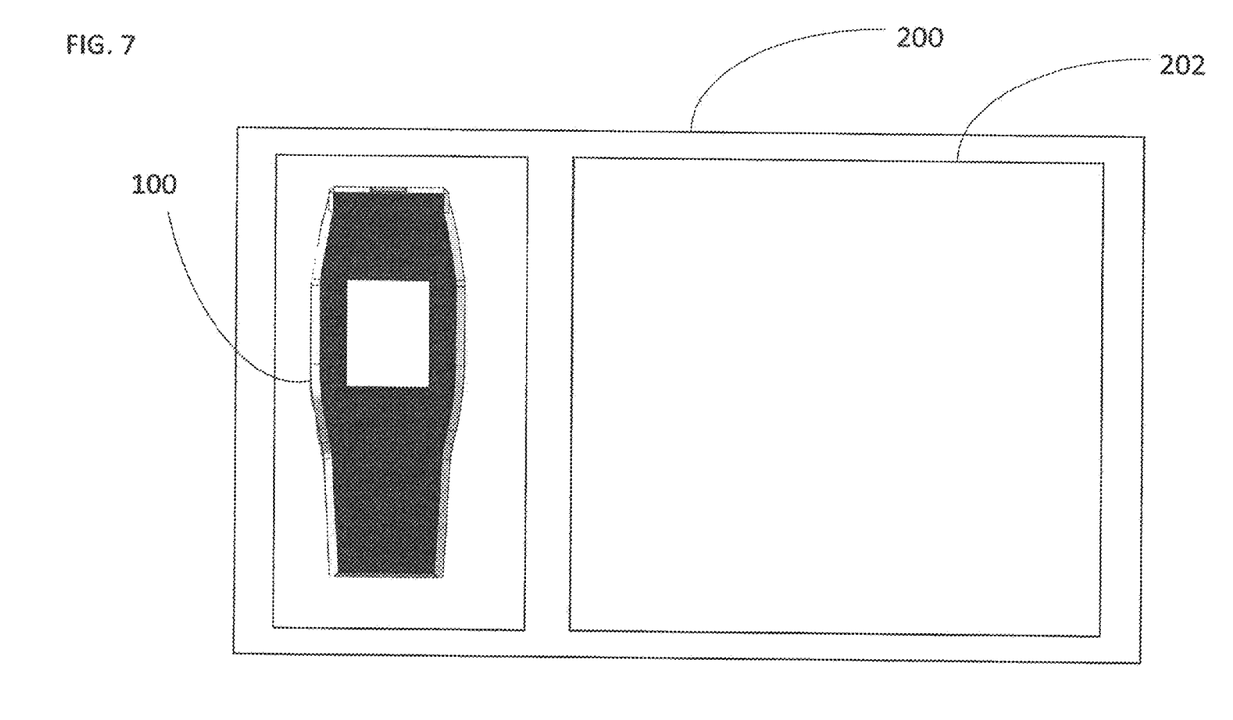
FIG. 7 is a functional diagram of communications within a system in an embodiment of the present invention.

Turning to FIGS. 6 and 7, a method of charging a battery is presented, the method suitable for use in charging mobile devices includes locating a plurality of charging stations with a charging location identification system.

The method can also include communicating from a communications platform information associated with the plurality of charging stations developing and presenting battery charging options utilizing a wayfinding system configured to provide prioritization information for potential users of the battery charging system.

The method can include annunciating with an alerting system configured to provide system status of a mobile device and arranged to interact with the wayfinding system. The method also includes commercializing battery charging systems utilizing a merchandising module configured to provide economic data and purchasing functions for the potential users of the battery charging system.

The method additionally can include charging a battery utilizing the plurality of charging stations.

The system can include communication means shared between cell phone users and mobile device users. The communication means can also utilize wireless communications platforms used to transmit data between system users and battery charging system components.

The system can include prioritization information to a system user in order to select charging options. The prioritization information can include remaining battery life before discharge or loss of functionality, estimated time left on a charge, battery condition, location of charging stations, ranking of charging stations based on distance and/or cost and/or charging station type of charge.

The system can include location identification systems utilizing GPS information transmitted with an emitter on or adjacent to a charging station, triangulation information based on location in the wireless environment, predetermined physical location identification provided by local municipality, location information transmitted from the electrical power source of the charging station, and/or building owner provided electronic location information.

The system can include annunciation mechanisms designed to alert users of battery status and pending charging needs. The annunciations can include mobile device vibrations, flashing lights, beeps and/or other sounds. The annunciations can be predetermined to increase in intensity as mobile device conditions become more pressing such as but not limited to a battery discharge or imminent failure of a mobile device.

The system can include a merchandising module configured to commercialize charging stations operations. The system can include providing users a plurality of charging location options, price differences amongst charging stations, charging type available at different locations, payment methods accepted at different charging stations, and payment options available from a user from a mobile device or pre-paid services.

The system can also include touchless payment methods, scanning payment methods, and biometric payment authorization methods.

The system can include a plurality of Apps operating on a plurality of wireless communications networks communicating in near real time logistical information concerning battery charging station options in a wireless communications area.

In some embodiments, the method or methods described above may be executed or carried out by a computing system including a tangible computer-readable storage medium, also described herein as a storage machine, that holds machine-readable instructions executable by a logic machine (i.e. a processor or programmable control device) to provide, implement, perform, and/or enact the above described methods, processes and/or tasks. When such methods and processes are implemented, the state of the storage machine may be changed to hold different data. For example, the storage machine may include memory devices such as various hard disk drives, CD, flash drives, cloud storage, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI) or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard or gaming controller. For example, a user input may indicate a request that certain task is to be executed by the computing system, such as requesting the computing system to display any of the above described information, or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

The present invention has been described with reference to the preferred embodiments, it should be noted and understood that various modifications and variations can be crafted by those skilled in the art without departing from the scope and spirit of the invention. Accordingly, the foregoing disclosure should be interpreted as illustrative only and is not to be interpreted in a limiting sense. Further it is intended that any other embodiments of the present invention that result from any changes in application or method of use or operation, method of manufacture, shape, size, or materials which are not specified within the detailed written description or illustrations contained herein are considered within the scope of the present invention.

While the foregoing invention has been described with reference to the above embodiments, additional modifications and changes can be made without departing from the spirit of the invention. Accordingly, such modifications and changes are considered to be within the scope of the appended claims.

What is claimed is:

1. A battery charging system suitable for charging mobile devices comprising:
    a plurality of charging stations, wherein the charging stations include a programmable end of life fuse, wherein the fuse functions to take the charging stations offline after a predetermined set time has expired and after a predetermined number of charging cycles has occurred;
    a charging station location identification system coupled with the plurality of charging stations;
    a communications platform configured to provide a communication means for the plurality of charging stations;
    a wayfinding system configured to provide prioritization information for potential users of the battery charging system and arranged to couple with the charging station location identification platform and the plurality of charging stations, wherein the wayfinding system includes a Bluetooth sensor, wherein the wayfinding system utilizes an automatic signal strength code selection algorithm to prioritize charging stations wherein the algorithm includes the Bluetooth sensor determining a strength of a coded signal from the charging stations, and evaluates a signal strength between two or more coded Bluetooth signals received, and selects the stronger of the two or more coded Bluetooth signals received to prioritize charging stations,
    and wherein the wayfinding system prioritizes charging stations based on type of battery charge desired,
    and wherein the wayfinding system is further configured to indicate travel paths to reach a charging station based on distance to a charging station, location of a charging station within a building, and cost of charging at a charging station;
    an alerting system configured to provide system status of a mobile device and arranged to interact with the wayfinding system, wherein the alert system automatically performs a search when a battery of the mobile device is at or below 15% remaining battery life; and
    a merchandising module configured to provide economic data and purchasing functions for the potential users of the battery charging system, wherein the module includes differentiation of costs between trickle charging, rapid charging, and high amperage charging.

2. The system of claim 1 further comprising a mobile application operating on a mobile device.

3. The system of claim 1 wherein the plurality of charging stations includes magnetic inductive charging, magnetic resonance charging, direct current hard wire, or radio frequency charging, battery charging capabilities.

4. The system of claim 1 wherein the charging station location identification system includes utilizing GPS, Bluetooth, Wi-Fi, mobile device location device, and cell phone call and text features to provide charging station location information to users of the system.

5. The system of claim 1 wherein the alerting system includes providing alarms and alerts configured to be received by a user of the system and wherein the alarms and alerts include physical, audible and visual annunciations.

6. The system of claim 1 wherein the merchandising module provides for ascertaining costs of the plurality of charging stations, automatically choosing a predetermined payment method, and completing a sale of charging services.

7. The system of claim 1 wherein the communications platform is configured to provide near real-time communication between the system and a mobile device.

8. The system of claim 1 wherein the wayfinding system includes annunciation capabilities on or adjacent to the plurality of charging stations.

* * * * *